US008461709B2

(12) United States Patent
Birkemose et al.

(10) Patent No.: US 8,461,709 B2
(45) Date of Patent: Jun. 11, 2013

(54) ASYNCHRONOUS POWER GENERATOR FOR A WIND TURBINE

(75) Inventors: Bo Birkemose, Brande (DK); Per Egedal, Herning (DK); Erik Groendahl, Them (DK)

(73) Assignee: Siemens Aktiengesellschaft, München (DE)

( * ) Notice: Subject to any disclaimer, the term of this patent is extended or adjusted under 35 U.S.C. 154(b) by 98 days.

(21) Appl. No.: 13/062,257

(22) PCT Filed: Aug. 19, 2009

(86) PCT No.: PCT/EP2009/060702
§ 371 (c)(1),
(2), (4) Date: May 17, 2011

(87) PCT Pub. No.: WO2010/031651
PCT Pub. Date: Mar. 25, 2010

(65) Prior Publication Data
US 2011/0210552 A1    Sep. 1, 2011

(30) Foreign Application Priority Data

Sep. 17, 2008  (EP) .................................... 08016397

(51) Int. Cl.
*H02P 9/48* (2006.01)
(52) U.S. Cl.
USPC .................................. 290/44; 290/52; 290/55

(58) Field of Classification Search
None
See application file for complete search history.

(56) References Cited

U.S. PATENT DOCUMENTS

| | | | |
|---|---|---|---|
| 4,629,959 A | | 12/1986 | Okuyama et al. |
| 5,321,308 A | * | 6/1994 | Johncock ..................... 290/40 C |
| 6,566,764 B2 | * | 5/2003 | Rebsdorf et al. ................ 290/44 |
| 2003/0052643 A1 | | 3/2003 | Sweo |
| 2004/0012203 A1 | | 1/2004 | Schlangen |
| 2007/0278797 A1 | * | 12/2007 | Flannery et al. ................ 290/44 |

FOREIGN PATENT DOCUMENTS

| DE | 102004056254 A1 | 6/2006 |
|---|---|---|
| EP | 1487095 A1 | 12/2004 |

OTHER PUBLICATIONS

Müller et al., "Adjustable Speed Generators for Wind Turbines based on Doubly-fed Induction Machines and 4-Quadrant IGBT Converters Linked to the Rotor", Industry Applications Conference 2000, IEEE Oct. 2000, Piscataway, JF, USA, vol. 4, pp. 2249-2254.
Levi et al., "Study of Main Flux Saturation Effects in Field-Oriented Induction Motor Drives", IEEE, Nov. 6, 1989, pp. 219-224.

* cited by examiner

*Primary Examiner* — Tulsidas C Patel
*Assistant Examiner* — Mark J Fink

(57) ABSTRACT

An asynchronous power generator for a wind turbine is provided. The asynchronous power generator includes a voltage supply and a stator with stator coils supplied with an alternating voltage by the voltage supply. The voltage supply is configured to adjust the voltage supplied to the stator coils based upon an output power generated by the wind turbine. Further, a method of voltage control is provided.

10 Claims, 2 Drawing Sheets

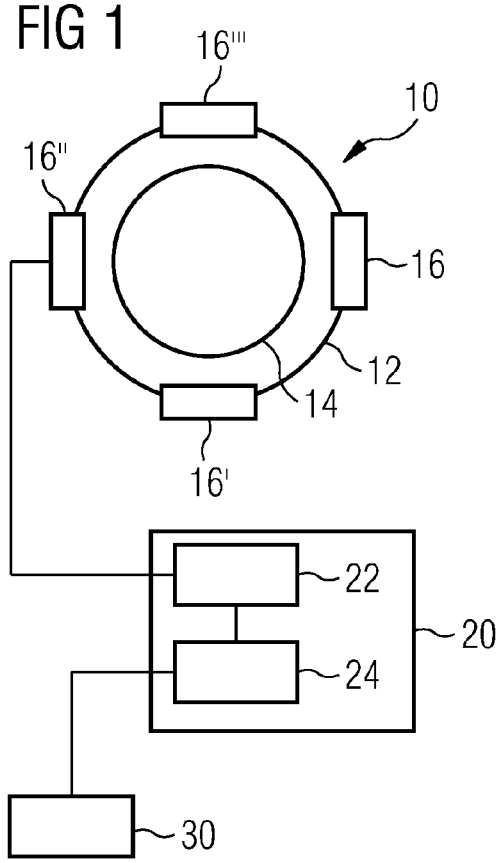
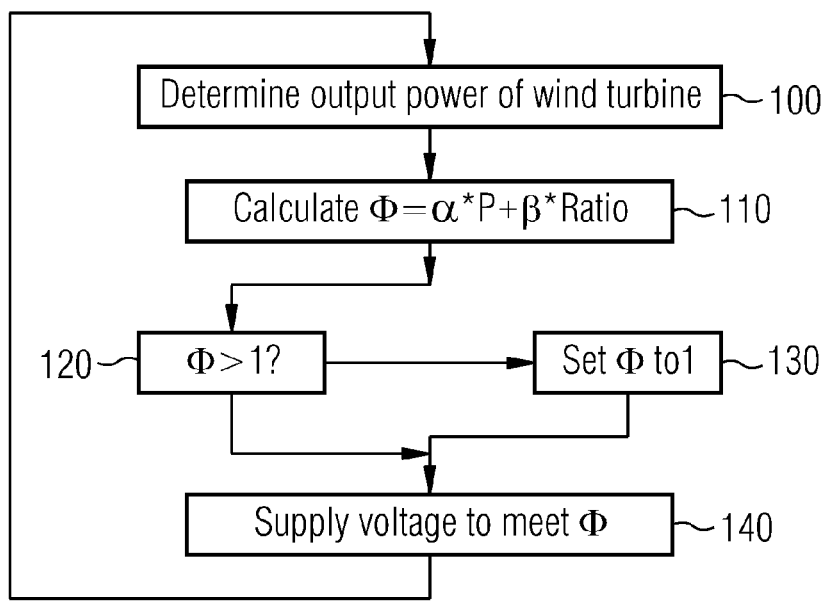

--- Flux Ratio = 1
— Flux Ratio = 0.4

--- $P_{max}$, Flux Ratio = 1
— $P_{max}$, Flux Ratio = 0.4
—·— Optimal Power

ASYNCHRONOUS POWER GENERATOR FOR A WIND TURBINE

CROSS REFERENCE TO RELATED APPLICATIONS

This application is the US National Stage of International Application No. PCT/EP2009/060702 filed Aug. 19, 2009, and claims the benefit thereof. The International Application claims the benefits of European Patent Application No. 08016397.5 EP filed Sep. 17, 2008. All of the applications are incorporated by reference herein in their entirety.

FIELD OF INVENTION

This invention relates to an asynchronous power generator for a wind turbine, comprising a voltage supply and a stator with stator coils supplied with an alternating voltage by the voltage supply, and a method of voltage control therefore.

BACKGROUND OF INVENTION

Asynchronous generators of the state of the art typically comprise a rotor and a stator with stator coils. Oftentimes, the stator core is built using a laminate of thin metal sheets.

In order to have the asynchronous generator to operate properly, the stator coils are supplied with an alternating voltage. This alternating voltage induces an alternating magnetic flux which, in systems of the state of the art, causes the stator core and the stator coils to vibrate.

Such vibration, however, produces a sound having the frequency of the alternating voltage supplied to the stator coils.

Particularly when used with wind turbines, the sound thus produced by the asynchronous generators is often found irritating by people in the immediate vicinity of the wind turbine, for instance by people living next to a wind turbine or a wind turbine park.

In order to reduce the noise thus generated by wind turbines, systems of the state of the art use noise reducing cladding for the generator housing of the wind turbine, which leads to increased material cost and additional technical effort in the manufacturing of wind turbines.

US 2003/052643 A1 discloses a brushless doubly-fed induction machine control in which a first stator and a second stator are present. In the first stator, the output power increases lineally with rotor speed. In the second stator, the output power is not dependent on the rotor speed and constant over the whole speed range. Normal full machine excitation is applied by a current controller.

S. Müller et al. "Adjustable speed generators for wind turbines based on doubly-fed induction machines and 4-quadrant IGBT converters linked to the rotor", Industry Applications Conference, 2000, Conference Record of the 2000 IEEE 8-12 Oct. 2000, Piscataway, N.J., USA, IEEE, vol. 4, 8 Oct. 2000, pages 2249-2254 describe an investigation of a doubly-fed induction generator system as an alternative to adjust speed over a wide range.

E. Levi et al. "Study of main flux saturation effects in field-oriented induction motor drives", 19891106, 19891106-19891110, 6 Nov. 1989, pages 219-224 describe a study of main flux saturation effect in field-oriented induction motor drives.

SUMMARY OF INVENTION

It is an object of present invention to provide an asynchronous generator that emits less noise than the systems known in the art.

This object is achieved by an asynchronous power generator and by a method of voltage control for reducing noise as claimed in the independent claims.

An asynchronous power generator for a wind turbine comprises a voltage supply and a stator with at least one stator coil supplied with an alternating voltage by the voltage supply, characterized in that the voltage supply is configured to adjust the voltage supplied to the stator coil based on the output power generated by the wind turbine for reducing noise from the asynchronous power generator.

By having a voltage supply that adjusts the voltage supplied to the stator coils, the present invention makes use of the relationship between the supplied voltage and the level of noise that is emitted due to the vibration of the stator core and the stator coils.

Since the intensity of the emitted sound will increase with the increasing magnitude of the supplied voltage, a proper adjustment of the voltage supplied to the stator coils reduces the emitted sound and thus achieves the object of the present invention. In particular, the adjustment of the power supplied to the stator coils is made dependent on the output power generated by the wind turbine. Thus, the present generator is enabled to adapt the supplied voltage to the current level of power, so that an optimum power output can be established even when reducing the magnitude of voltage supplied to the stator coils.

Thus, while establishing optimum output power, the present invention may reduce the supplied voltage, which in turn will lead to a reduction in the magnitude of the flux in the stator core laminate and therefore will reduce the vibrations of the active stator parts, leading to a substantial noise reduction.

The components of the present invention and their configuration can be implemented using hardware and/or software functional components. In particular, these functional components may be configured to implement any of the method steps according to another aspect of the present invention as will be described later.

In embodiments, the voltage supply can be configured to reduce the voltage supplied to the stator coil on the condition of the output power decreasing.

Further, embodiments of the asynchronous power generator can be characterized in that the voltage supply is configured to increase the voltage supplied to the stator coil on the condition of the output power increasing.

In embodiments, the voltage supply can be configured to adjust the voltage supplied to the stator coil such that the noimalized flux $\Phi$ occurring in the coils depends linearly on the output power, in particular such that the nomialized flux $\Phi$ satisfies the condition $$\Phi = \alpha \cdot P + \beta \cdot \text{Ratio}$$

wherein P is the output power, $\alpha$ and $\beta$ are constants, and Ratio is a flux ratio parameter, which can be set to a desired value that allows to adjust at which output power the nounalized flux $\Phi$ reaches its maximum value. Note, that the voltage is proportional to the electrical stator frequency times the flux.

In such an embodiment, the maximum value of $\Phi$ can be limited to a maximum of 1.

A method of voltage control for reducing noise from the asynchronous power generator comprises the steps of:
- Determining an output power generated by the wind turbine, and
- Adjusting an alternating voltage supplied to at least one stator coil of a stator of the asynchronous power generator, based on the determined output power.

Thus, a method is given for use with the asynchronous generator that provides for the technical effects presented by the generator or any one of its embodiments, particularly when the voltage supply, or other of the functional components of the generator, are configured to execute the method steps.

BRIEF DESCRIPTION OF THE DRAWINGS

The invention will be described in more detail below, referring to the following figures:

FIG. 1 shows a schematic overview of an embodiment of the asynchronous generator;

FIG. 2 shows a schematic overview of an embodiment of the method of voltage control;

DETAILED DESCRIPTION OF INVENTION

Figure 3:
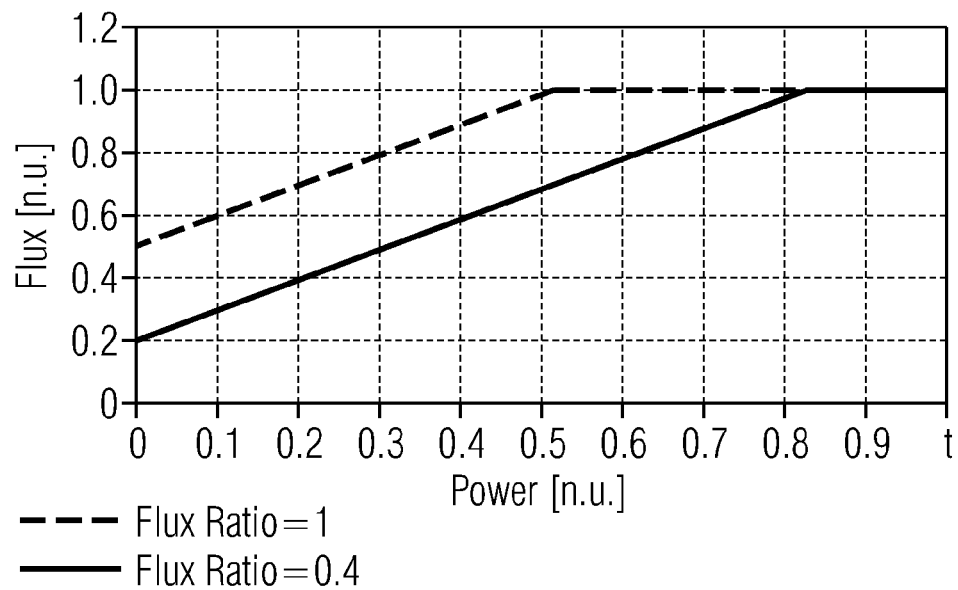
FIG. 3 shows a diagram representing the relationship between flux and output power provided by the embodiment of FIGS. 1 and 2.

FIG. 1 shows a schematic overview of an embodiment of the asynchronous generator. The asynchronous generator shown in FIG. 1 comprises electromagnetic parts 10 and a voltage control unit 20, which is coupled to external measurement and control equipment 30.

The electromagnetic components 10 of the asynchronous generator comprise a stator 12, a rotor 14, and stator coils 16, 16', 16", and 16'''. The stator core of stator 12 is manufactured based on a laminate of thin metal sheets. Stator coils 16, 16', 16", and 16''' are supplied with an alternating voltage, presently indicated by the connection between coil 16" and voltage output unit 22 of voltage supply 20, and further a series connection of the four stator coils.

Voltage supply 20 comprises voltage output unit 22 and output power determining unit 24. While voltage output unit 22 is connected to coil 16" as described above, output power determining unit 24 is connected to further external measurement and/or control equipment of a wind turbine, in order to obtain all necessary input parameters for determining the generated output power of the wind turbine in a continuous or periodical manner.

In order to supply voltage to the stator coils while substantially reducing the noise generated by vibrations of the stator core and the stator coils due to the supplied alternating voltage and alternating magnetic flux induced thereby, the voltage control unit 20 operates as described with respect to the method shown in FIG. 2.

FIG. 2 shows the method as embodied by the voltage control unit 20. In step 100, output power determining unit 24 of voltage supply 20 obtains the current output power of the wind turbine by receiving a corresponding parameter value from the control unit 30 of the wind turbine to which the present generator belongs.

In step 110, the voltage output unit 22 calculates the desired flux corresponding to the determined output power. For this, voltage output unit 22 may comprise appropriate electronic components and/or processors and/or software. In the present embodiment, the desired flux $\Phi$ is derived based on a linear relationship between the flux $\Phi$ and the determined output power. In particular, the voltage output unit 22 thus may calculate the desired flux $\Phi$ according to the following linear equation:

$$\Phi = \alpha \cdot P + \beta \cdot \text{Ratio}$$

wherein P is the output power, $\alpha$ and $\beta$ are constants, where $\alpha$ represents the slope and $\beta$ the y-intercept. Ratio is an optional parameter called flux ratio by which the y-intercept can be scaled.

In step 120, voltage output unit 22 then determines if $\Phi$, normalised to the maximum flux, is larger than 1, and if so, sets $\Phi$ to the value of 1 in step 130. Thus, the desired flux is limited to a maximum value of 1.

If the value of $\Phi$ is not larger than 1, the voltage output unit 22 continues using the value of $\Phi$ calculated in step 110.

In step 140, voltage output unit 22 determines the amount of voltage appropriate for inducing the desired flux $\Phi$ and supplies this amount of voltage to the coils 16, 16', 16", and 16'''.

Thus, the voltage control unit 20 reduces the voltage supplied to the stator coils when the output power from the generator of the wind turbine is low, for instance, when the wind speed is low. Such reduction of the supplied voltage leads to a reduction in the magnitude on the flux in the stator core laminate and therefore significantly reduces the vibrations of the active stator parts and, consequently, the noise thus generated.

Such reduction can be performed when the generator of the wind turbine is operated at low output power, since in such a case, optimum output power can be achieved even when the stator coils produce a relatively low magnetic flux. In cases where the generator is operated at or close to its maximum output power, the magnitude of the flux produced by the stator coils must be at or close to its maximum value. However, noise that is generated under such circumstances typically does not substantially add to the overall noise level, since maximum output is usually achieved when the wind speed is high, and noises occurring from various other sources than the generator under conditions of high wind speed will drown out the noises produced by the wind turbine generator.

FIG. 3 shows the relationship between the flux and the output power as provided by the embodiment. In this diagram, the flux $\Phi$, normalised to the maximum flux, varies according to $$\Phi = \alpha \cdot P + \beta \cdot \text{Ratio}$$

when $\Phi$ is less than one and $$\Phi = 1$$

otherwise.

Here, P denotes the current output power, $\alpha$ and $\beta$ are constants, where $\alpha$ represents the slope and $\beta$ the y-intercept. Ratio is the flux ratio parameter mentioned above. With the constants $\alpha$ and $\beta$ fixed the flux ratio parameter determines, at which output power (I) reaches its maximum value.

In FIG. 3, the power is normalised to the nominal output power of the generator $P_{norm}$, and flux is normalised to the maximum flux. The abbreviation n.u. used in the diagram denotes normalised units. In the present diagram, the variation of the flux as a function of the power is shown for two different values of the flux ratio parameter Ratio, namely 1 and 0.4. The slope $\alpha$ is set to 1 and the y-intercept $\beta$ is set to 0.5. A lower value of the flux ratio parameter results in a lower flux when the power is low, as can be seen for the values of the flux ratio of 1, and of 0.4 in the diagram. Note, however, that the same results as those shown in FIG. 3 can be achieved without the use of the flux ratio parameter by adapting the y-intercept $\beta$, which would correspond to fixing the flux ratio parameter to 1 in the above example. Then, in FIG. 3, the y-intercept $\beta$ for the line denominated "flux ratio=0.4" would be reduced from 0.5 to 0.2 rather than scaling it with the flux ratio parameter.

Figure 4:
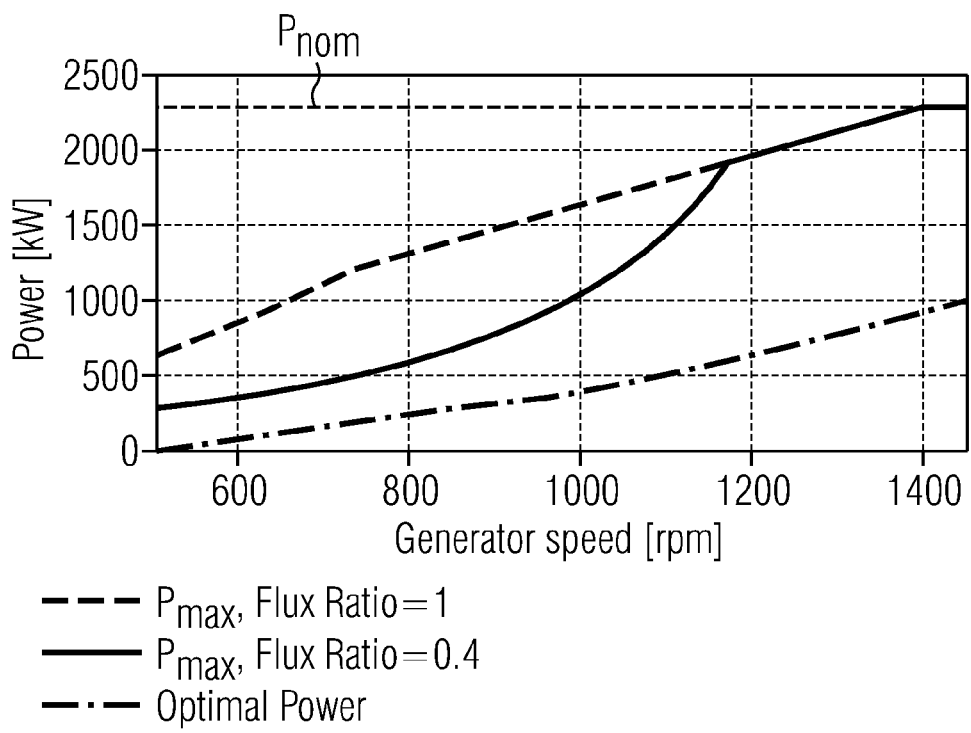
FIG. 4 shows the relationship between output power and generator speed as provided by the embodiment of FIGS. 1 and 2.

FIG. 4 shows the relationship between the output power generated and the generator speed as taking place with the present embodiment of the invention with a nominal output power $P_{nom}$=2300 kW and a nominal generator speed $n_{nom}$=1400 rpm. The present diagram shows the variation of the maximum output power for the two different values 1 and 0.4 of the flux ratio parameter as shown in FIG. 3.

When the generator speed, n, is less than the nominal generator speed $n_{nom}$, the maximum value of the output power than can be achieved, $P_{max}$, can be expressed by following equation:

$$P_{max} = P_{nom} \frac{n}{n_{nom}} \Phi \qquad \text{Eq. (1)}$$

When the flux is equal to 1 (n.u.), and the generator speed $n<n_{nom}$, we see that $P_{max}$ is proportional to $P_{nom}$. If $n>n_{nom}$ then $P_{max}=P_{nom}$.

When the flux $\Phi$ is less than 1, eq. (1) is equivalent to $$P_{max} = P_{nom} \frac{n}{n_{nom}} (\alpha \cdot P_{max} + \beta \cdot \text{Ratio}) \qquad \text{Eq. (2)}$$

Eq. (2) can be solved for $P_{max}$ under the constraints that $\Phi<1$ and $P_{max} \leq P_{nom}$. One finds:

$$P_{max} = P_{nom} \frac{\beta \cdot \text{Ratio}}{\frac{n_{nom}}{n} - \alpha \cdot P_{nom}}$$

The bottom curve shows the output power when the wind turbine is operated optimally under conditions of low wind speed. Optimal operation of the wind turbine means that pitch and speed of rotation of the blades of the turbine have been optimised relative to the prevailing wind conditions.

As the optimal power in this example is below $P_{max}$ for a flux ratio parameter of 0.4, the reduction in flux has no effect on the output power while substantially reducing the intensity of the acoustic noise emitted by the generator.

Therefore, the present system and the method provides for a significant reduction in acoustic noise without reducing the output power.

The invention claimed is:

1. An asynchronous power generator for a wind turbine, comprising:
    a voltage supply; and
    a stator with at least one stator coil supplied with an alternating voltage by the voltage supply,
    wherein the voltage supply is configured to adjust a voltage supplied to the at least one stator coil based upon an output power generated by the wind turbine for reducing noise from the asynchronous power generator,
    wherein the voltage supply adjusts the voltage supplied to the at least one stator coil such that a normalized flux $\Phi$ occurring in the at least one stator coil depends on the output power as $\Phi = \alpha \cdot P + \beta \cdot \text{Ratio}$ wherein P is the output power, $\alpha$ is a slope and $\beta \cdot$Ratio is a y-intercept,
    wherein the y-intercept is scaled to value such that the optimal power output of the wind turbine at a given speed is lesser than a maximum power output that can be achieved at that speed for said value of the y-intercept.

2. The asynchronous power generator according to claim 1, wherein the voltage supply reduces the voltage supplied to the at least one stator coil based upon an output power decrease.

3. The asynchronous power generator according to claim 1, wherein the voltage supply increases the voltage supplied to the at least one stator coil based upon an output power increase.

4. The asynchronous power generator according to claim 2, wherein the voltage supply increases the voltage supplied to the at least one stator coil based upon an output power increase.

5. The asynchronous power generator according to claim 1, wherein a maximum value of $\Phi$ is limited to 1.

6. A method of voltage control for reducing noise from an asynchronous power generator for a wind turbine, the method comprising:
    determining an output power generated by the wind turbine, and
    adjusting an alternating voltage supplied to at least one stator coil of a stator of the asynchronous power generator based upon a determined output power,
    wherein the voltage supplied to the at least one stator coil is adjusted such that a normalized flux $\Phi$ occurring in the at least one stator coil depends on the output power as $\Phi = \alpha \cdot P + \beta \cdot \text{Ratio}$ wherein P is the output power, $\alpha$ is a slope and $\beta \cdot$Ratio is a y-intercept,
    wherein the y-intercept is scaled to value such that the optimal power output of the wind turbine at a given speed is lesser than a maximum power output that can be achieved at that speed for said value of the y-intercept.

7. The method according to claim 6, wherein the adjusting comprises reducing the voltage supplied to the at least one stator coil based upon an output power decrease.

8. The method according to claim 6, wherein the adjusting comprises increasing the voltage supplied to the at least one stator coil based upon an output power increase.

9. The method according to claim 7, wherein the adjusting comprises increasing the voltage supplied to the at least one stator coil based upon an output power increase.

10. The method according to claim 6, wherein a maximum value of $\Phi$ is limited to 1.

* * * * *